364-420 SR
XR 3,805,035
SEARCH ROOM

United Stat [redacted]

Serra

[11] 3,805,035

[45] Apr. 16, 1974

[54] DEVICE FOR THE LOGICAL ANALYSIS OF TEXTURES

[75] Inventor: Jean Serra, Fontainebleau, France

[73] Assignee: A.R.M.I.N.E.S. Association Pour la Recherche et le Developpement des Methodes et Processus Industriels, Paris, France

[22] Filed: June 9, 1971

[21] Appl. No.: 151,274

[30] Foreign Application Priority Data

June 10, 1970 France .............................. 70.21322

[52] U.S. Cl.235/151.3, 178/DIG. 34, 178/DIG. 36, 178/6, 250/59, 340/146.3 Q

[51] Int. Cl. .............................................. G01b 7/28

[58] Field of Search. 178/DIG. 5, DIG. 34, DIG. 36, 178/6; 209/111.5; 250/49.5 R, 59, 219 R, 219 DF, 219 FR, 219 WD; 340/146.3 H, 146.3 Q, 165, 265; 235/151.3

[56] References Cited

UNITED STATES PATENTS

| | | | |
|---|---|---|---|
| 3,521,236 | 7/1970 | Parks et al. | 340/146.3 Q |
| 3,471,831 | 10/1969 | Parks | 340/146.3 Q |
| 3,534,332 | 10/1970 | Parks | 340/146.3 Q |

*Primary Examiner*—Malcolm A. Morrison
*Assistant Examiner*—R. Stephen Dildine, Jr.
*Attorney, Agent, or Firm*—Kurt Kelman

[57] ABSTRACT

Apparatus for the analysis of heterogeneous textures which forms an electrical image of a medium by such means as a television camera for line-by-line scanning of an image of said medium which is obtained by suitable means such as a microscope. The invention makes it possible to carry out on this primary electrical image by processing in combinations of logic circuits a series of conversions in accordance with predetermined Boolean logical laws which result in new converted electrical images on which it is possible to carry out counts of particles, measurements of particle sizes, determinations of shapes and the like.The Boolean laws employed are of the type in which the values of the electrical image signal corresponding to $p$ points which are geometrically contiguous in the medium are compared with a set of $p$ pre-established values and a new signal which assumes distinct discrete values depending on whether there is concordance or not is formed during the scanning operation. The invention applies in particular to problems of mineralogy, biology, medicine, petrography, metallography and the like.

5 Claims, 7 Drawing Figures

INVENTOR
JEAN SERRA
BY Kurt Kelman
AGENT

INVENTOR
JEAN SERRA
BY Kurt Kelman
AGENT

INVENTOR
JEAN SERRA
BY Kurt Kelman
AGENT

DEVICE FOR THE LOGICAL ANALYSIS OF TEXTURES

This invention is concerned with the field of mathematical or statistical analysis of the texture of a non-homogeneous medium which can be represented by a measurable physical quantity which can be preferentially and by way of example an electric signal whose amplitude represents a predetermined quality of a zone which is displaced throughout the medium to be analyzed.

One system for analyzing the texture of a heterogeneous medium which is already known carries out automatically and rapidly operations involving analysis of images which represent said medium and statistical calculation on the basis of data provided as a result of said analysis.

The system under consideration mainly comprises an optical assembly which can include a microscope or an optical-electronic system and produces an image of a zone of the heterogeneous medium under analysis, a receiver for converting said image to an electric signal which is representative of a qualtity, that is to say of a qualitiative characteristic or of a quantity which is characteristic of said zone, scanning means which serve to displace said zone throughout the medium to be analyzed and which can be mechanical means such as a microscope stage or electronic means as is the case with the use of a television camera and of an optical microscope, of a scanning electron microscope or of a scanning electronic microanalyzer. Logical means carry out the operations of statistical calculation on the basis of the signal which is thus obtained, thus constituting what may be referred-to as an electrical image of the medium under consideration.

The aim of this invention is to provide on the basis of a primary electrical image a series of new electrical images which are converted in accordance with preprogrammed Boolean logical laws for the purpose of automatic statistical analysis of the geometrical distribution and morphology of distinct qualities such as color, density, hardness, presence or absence of a substance and the like which are distributed within a heterogeneous medium.

In the following description, the term "structuring pattern" will be employed to designate an element or configuration having any predetermined geometrical form, i.e., a standard structuring pattern, such that the association of ratios which are perceived simultaneously by means of an optical instrument, for example, through said structuring pattern which is located at one point of the object such as a narrow window will be characterized by the value of one or zero according as said pattern in said location either confirms or invalidates a question which is addressed to said pattern by the object.

Thus, values one by one which are taken from the medium being analyzed are compared with preselected values forming the standard structuring pattern.

In order to achieve the aim referred-to above, the invention is accordingly directed to a logical device for analyzing the texture of a heterogeneous medium of which an electrical image is formed by displacing within said medium by suitable scanning means which are preferably electronic a zone in which a predetermined quality of qualitative characteristic is to be detected and converted to a first electrical signal which constitutes said electrical image and said device essentially comprises in combination: a first logical processing system for forming a first converted electrical image comprising storage means for recording at each instant that portion of said electric signal which is necessary for the following logical processing, means for taking $p$ values at $p$ predetermined addresses of said storage means and comparing said values one by one with at least one set of preselected $p$ values forming a standard structuring pattern, means for producing a second electric signal having different values depending on whether there is either concordance or discordance with said structuring pattern, said second signal being intended to constitute an information sequence which forms a first converted electrical image ; if necessary a second followed by a third or more logical processing systems for forming successively a second followed by a third or more converted electrical images ; each of said logical processing systems being intended to receive at least one of the different electrical images as an input signal ; and a counting system comprising storage means which record the successive values of the last electric signal which forms the last converted electrical image, logical selection means for comparing $k$ by $k$ the values which are thus stored and the counting means which summate the concordance and discordance numerals.

In a preferred embodiment in which the first electric signal consists of a series of binary signals which can assume only one or two values $e_0$ and $e_1$, said device essentially comprises in combination : a first logical processing system for forming a first converted electrical image comprising means for taking $p$ values representative of $p$ zones which are geometrically continuous in the medium to be analyzed and for comparing said values one by one with a set of $p$ identical values which are equal to $e_1$ so as to form a structuring pattern and means for producing a second electric signal having a value $e_0$ when the aforesaid $p$ values are all equal simultaneously to $e_1$ and having a value $e_1$ when this is not the case, the series of binary signals which are thus constituted being such as to form the first converted image ; and a counting system comprising a second logical processing system which is identical in every respect with said first logical processing system and supplies a second transformed image in accordance with the same logical law and counting means which summate the numbers of binary signals having a value $e_0$ and a vlaue $e_1$ of the second converted image.

The known systems for analyzing textures comprise either mechanical or electronic means for scanning the image of the medium under study. In a particular form of construction , said means comprise an optical system such as a microscope, for example,which forms an image on the sensitive surface of a television camera.It is known that in a camera of this type the images are scanned along successive lines over the entire surface of the image. The time of scanning of one line which will be designated as $t_0$ represents the time taken to pass from one point to another, said points being located opposite to each other on two consecutive lines.-This is the line scanning time or period.

It is therefore apparent that, if instantaneous values which are spaced in time by $t_0$ are collected from the video signal delivered by the camera or its all-or-none transform and that said values are stored in a memory system, values corresponding to two points of the image which are located in opposite relation on two consecutive scanning lines can be made available at the same time.The same result can be obtained by passing the video signal (or its transform) through a delay line having a time-delay equal to $t_o$. Values corresponding to two opposite points on two successive scanning lines are then available at the same instant upstream and downstream of the delay line. More generally, $n$ values corresponding to n points located in adjacent relation on $n$ successive lines can be made available simultaneously in the same manner. Even more generally, if trains of data corresponding to series of $m$ contiguous points on a line are processed instead of instantaneous values and two successive trains are separated by the time interval $t_o$, there is made available at the same time a set of data corresponding to $n \cdot m$ points disposed on a rectangle whose sides are respectively equal to $n$ times the space between lines and $m$ times the analysis pitch.It is readily understood that this rectangle is displaced within the image at the scanning speed.

If consideration is given to data trains having unequal lengths or separated by intervals which are different from $t_o$, it is immediately apparent that it is possible to group together data corresponding to points which form geometrical figures other than a rectangle such as a lozenge, a parallelogram, a hexagon and so forth. The case of the hexagon which is formed of seven points is of particular interest and will be studied in greater detail in the examples which are given hereinafter.

In consequence, the invention proposes to form one or a number of new electrical images from the primary electrical image of the medium under study which is supplied by the camera, said image being converted by subjecting the group of data corresponding to a geometrical arrangement of points in the medium to conversion in accordance with pre-established Boolean laws. In a more concrete manner, consideration is given to a set of points in accordance with a geometrical configuration such as,for example,four points forming a square which scans the entire medium line-by-line and is displaced by one line at each outward transit. Said set of points is continuously tested in order to detect in each position which it occupies in the medium during the scan either the concordance or disconcordance of said set in relation to a standard configuration or image. The all-or-none response to this test constitutes a new series of logical data which forms a new converted electrical image. It will be endeavored to determine,for example,in each position of the square whether three of the points are in one quality of the medium and the fourth point is outside said quality ; it will be seen hereinafter that this test is useful for the purpose of carrying out counts of particles or more generally determinations of shapes.From the point of view of the medium which is being tested,this series of operations is tantamount to determination in said medium of the occurrences of an event which has a portion of surface or even of volume of said medium as a geometrical support and is constituted by a certain arrangement of qualities of unitary zones (or points) of said portion of surface or of volume whereas said portion explores the entire medium by means of successive translational displacements. In short, this virtually consists in associating with said event the center of gravity of that portion of surface or of volume which serves as a field of definition of said event and in constructing point by point a new all-or-none image of the medium by generating a further signal which assumes two discrete values according as the response to the given event is "yes" or "no."

Depending on the finality of the statistical analysis performed, such more or less complex image conversions will be carried out either successively in cascade, each converted image being in turn converted in accordance with the same or another Boolean law or simultaneously in parallel in a number of calculation channels in accordance with different Boolean laws or again in accordance with any combination of these two modes. Examples of this will be given hereinafter.

The final converted image is then subjected to a process of texture analysis which is already known such as, for example, the process described in U.S. Pat. No. 3,449,586.

The device in accordance with the present invention finds a large number of statistical mathematical applications in the field of mathematical morphology and of analysis of the texture of non-homogenous media. Examples of calculations which can be performed automatically by means of this device are described in the works by G. Matheron ("Elements pour une theorie des milieux poreux," Masson, Paris 1967) and J. Serra ("Introduction a la morphologie mathematique," Ecole des Mines, Paris 1969).

Solely in order to provide an explanatory illustration which will serve to gain a clear understanding of the invention and similarly in order to bring out the particular features and advantages thereof, examples of execution and application will now be given without any implied limitation, reference being made to the accompanying drawings, wherein.

Figure 1:
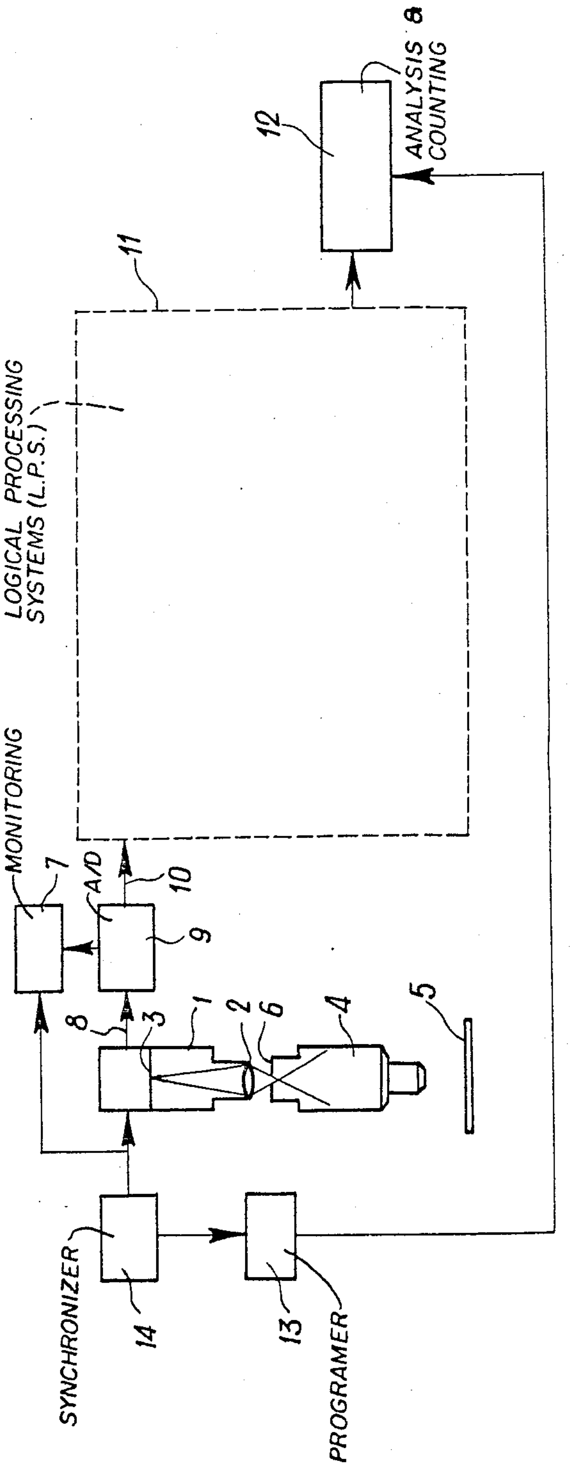
FIG. 1 is a general diagram of a texture - analyzing apparatus.

FIG. 1 is a diagrammatic presentation of a complete apparatus for the automatic statistical analysis of textures, said apparatus being provided with a device in accordance with the present invention. In this figure, the reference numeral 1 designates a television camera whose lens is designated by the reference numeral 2 and the photosensitive surface of which is designated by the numeral 3.Said camera receives from a microscope 4 the real image of a sample 5 which, by way of example, can be a thin strip, a photographic plate or the like. A diaphragm 6 is located in the plane of the real image which is produced by the microscope 4 and serves to adjust the dimensions of the useful image. The object-plane of the camrea lens 2 coincides with the plane of the real image and of the diaphragm 6. The lens 2 finally forms on the sensitive plate 3 of the camera an enlarged real image of the surface considered of the sample 5.There is shown at 7 a monitoring receiver which serves to re-convert into images the video signals which are delivered at the output 8 of the camera. Said output is also connected to the input of electronic analog-to digital conversion circuits 9 of the Schmitt trigger type which sample at a frequency of 10 Mc/S the video signal which is delivered at 8 so as to collect the corresponding values at successive points or zones of the image on a scanning line and which delivers at 10 and at a frequency of 10 Mc/s pulses which are capable of assuming two discrete values as represented hereinafter by "0" and "1" depending on whether the signal is lower or higher than a predetermined threshold. These two values correspond respectively to the absence or to the presence of a predetermined quality of the sample such as a color, for example, or a predetermined constituent. The digital electric signal which is present at 10 constitutes what has been referred-to in the foregoing as the primary electrical image. Each pulse having a frequency of 10 Mc/s represents a small elementary zone or point of the image of the sample. Said primary electrical image is then processed in accordance with the invention so as to form a new electrical image by means of the device which is located within the dashed-line rectangle 11. The operation of said device is in accordance with the explanations which have been given earlier and will be examined in greater detail hereinafter. The converted electrical image is transmitted to a logical analysis and counting system 12 which is already known and performs the necessary calculations. By way of example, this system can be of the type described in U.S. Pat. No. 3,449,586.

A programmer whose function is to coordinate the scanning of the television camera and the performance of the statistical calculation operations performed by the circuits 12 is shown at 13. Thus, starting from the synchronization pulses which it receives from the "line-scanning" and "image-scanning" circuits 14 of the camera, said programmer initiates opening and closing of the different gates of the circuit 12 in order to introduce the digital data into the memory or storage circuits, shifting of the registers, operation of the counters and so forth. The circuits just mentioned which form part of the assembly 12 are already known and are neither illustrated nor described in detail.

Figure 2:
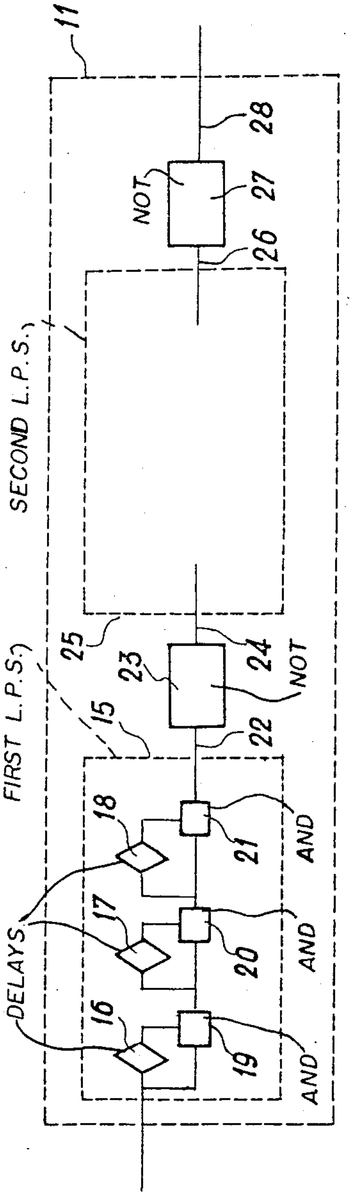
FIG. 2 shows in detail a logic circuit assembly in accordance with the invention.

FIG. 2 shows the detail of the rectangle 11 for one application to the measurement of bidimensional particle sizes in a plane from a thin strip, for example. The object under analysis can be a mineral such as an ore, for example. It will accordingly be assumed that it is desired to determine the particle-size distribution of one of the constituents of said mineral. The video signal which is delivered by the camera at 8 is rendered discrete with respect to a threshold in the circuit 9 and the "all-or-none" electrical image which appears at 10 can therefore assume the value "0" away from said constituent (video signal lower than the threshold) and "1" within said constituent (video signal higher than the threshold). The elements having the value "1" will be referred-to as "grains" and the elements having the value "0" will be referred-to as "pores," this being equivalent to a black and white image which solely represents said constituent.

Scanning is carried out by means of a set of seven points disposed in staggered relation so as to form a hexagon (FIG.3) as mentioned in the published works by G. Matheron and J. Serra which have already been cited.

Figure 3:
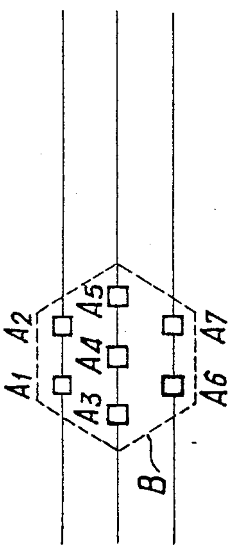
FIG. 3 shows the arrangement of data which are processed by means of the circuits of the preceding figure.
Figure 4:
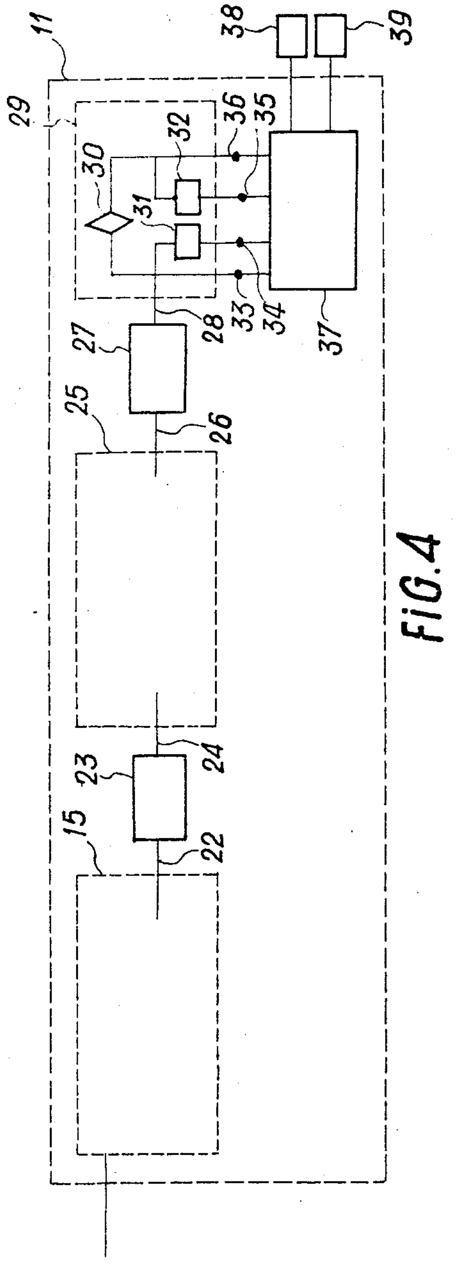
FIG. 4 shows another logic circuit assembly in accordance with the invention.

Grouping of said seven points as designated by the references $a_1$ to $a_7$ in FIG. 3 is carried out by means of a logic sub-assembly 15 of the assembly 11 (FIG. 11), the operation of which will now be explained. The electrical image which appears at 10 is applied to a series of three delay lines 16, 17, 18, the delay times of which are respectively equal to $t_o + t\ (a/2)$ , $t_o - t\ (a/2)$ and $t_a$ , wherein $t_o$ is the time-duration of a scanning line and $t_a$ is the time which elapses between two successive samplings of the video signal delivered by the camera 1, namely the time taken to travel over the distance $a$ between two successive measuring zones such as $d_1$ and $d_2$, for example. Said delay lines can either be electromechanical analog lines or digital flip-flops having a suitable operating time. Thus, the first delay line rearranges the spatial location of data in a hexagonal frame and makes it possible to have available at the same time data relating to two zones separated by a line which is increased by the distance $a/2$ , for example $a_4$ and $a_7$ , or $a_1$ and $a_4$ , or $a_2$ and $a_5$, and so forth, and to compare them by means of an AND-gate 19 which delivers a signal having the value of "1" when both zones have the value "1" at the same time. Similarly, the delay line 17 makes it possible to compare at the same moment two zones separated by a line which is reduced by the distance $a/2$ such as $a_5$ and $a_7$, $a_2$ and $a_4$ and so forth by means of an AND-gate 20 whilst the delay line 18 makes it possible to compare two zones such as $a_1$ and $a_2$, $d_3$ and $d_4$ and so forth which are located at a distance $a$ on a same line. It is therefore apparent from the circuit arrangement of FIG. 2, that, at the moment at which the signal $a_7$ passes into the logic subassembly 15, the signal which is delivered therefrom at 22 has the value "1" only if the seven zones $a_1, a_2 \ldots a_7$ all have the value "1" at the same time. It will also be noted that the three delay lines 16, 17, 18 can be disposed in any order without changing the result in any way whatsoever. The seven zones $a_1$ to $a_7$ can reasonably be assimilated with their hexagonal convex envelope B which is represented in dashed outline in FIG. 3 ; and it may be stated that the signal which appears at 22 has the value "1" if the entire hexagon B is within the constituent "1," that is to say within a grain. When the data of the primary electrical image which we shall designate as A are passed during the course of time through the sub-assembly 15, the operation takes place as if B were displaced in successive translational movements having a modulus "$a$" along scanning lines through the object to be analyzed. At each location of B within the object, the new electrical image A′ which appears at 22 assumes the value "1" if the hexagon is completely included in the grains and "0" in the contrary case. By adopting the same indications and terminology as those employed in the references which were cited earlier, it will be stated that an erosion of the grains has been effected by B and we may write : $A' = A \theta B$ . In short, this means that the new electrical image $A'$ represents a fictitious objective in which the grains or the initial object are assumed to have been eroded over their entire periphery by a quantity equal to the diameter D of lhe circle which is circumscribed about the hexagon $B$.

In accordance with the present invention, the converted electrical image $A'$ is subjected to a further conversion similar to that which has just been explained. Referring again to FIG. 2, it is apparent that the signal $A'$ is applied to an inversion circuit 23 which converts said signal to its complementary value $A'c$, that is to say which forms a new signal having the value "1" when $A'$ has the value "0" and conversely which appears at 24 ; $A'c$ is in fact the image of the pores whereas $A'$ is the image of the grains as would be the case with a negative image. $A'c$ is in turn transmitted to a logic sub-assembly 25 which is wholly identical with the sub-assembly 15 and effects an erosion of the image $A'c$,that is to say an erosion of the pores which is equivalent to swelling or expansion of the grains while delivering at 26 a further converted image $A''$. We note :

$A'' = A'c \; \theta \; B$ or $A' = (A \; \theta \; B) \; c \; \theta \; B$

A second inversion circuit 27 which is identical with the circuit 23 supplies at 28 the signal $A''c$ which is complementary to $A''$,thereby again providing a positive image of the grains. It is noted that :

$$A''c = (A \; \theta \; B) \; \theta \; B$$

and it is stated that erosion along $B$ has been followed by expansion along $B$. In this transformation, the electrical image has lost all the signals having the value "1" which represented grains whose maximum diameter was smaller than the diameter $D$ of the circle which is circumscribed about the hexagon $B$ as well as "isthmuses" or shrinkages of grains which were smaller than $D$ and "capes" having a width smaller than $D$.

A knowledge of $A''c$ is of very appreciable practical interest. In fact, the difference between the relative proportion of signals having the value "1" in the initial image A and in the converted image $A''c$ is a measurement of the particle size of the primitive image $A$ since it indicates the proportion of the surface of the image which has disappeared during the erosion along $B$.

It is therefore apparent that, by carrying out conversions with different dimensions of the hexagon $B$,it is possible to construct the curve of two-dimensional particle size of the object.These results are demonstrated mathematically in the published work by G. Matheron which has been cited in the foregoing.

Figure 5:
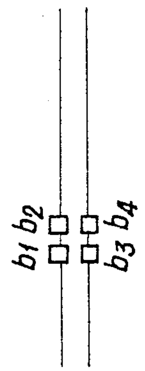
FIG. 5 shows the arrangement of data which are processed by the circuits of the preceding figure.

The following example for which reference will also be made to FIGS. 4 to 7 utilizes the results supplied by the preceding and goes further by subjecting the image to an additional conversion. This system makes it possible to register the numbers of grains or masses of grains as a function of their dimensions. FIG. 1 shows the logic system which is employed for this purpose. Within the rectangle 11 of FIG. 1, there are shown the logical conversion circuits 15 and 25 and the inversion circuits 23 and 27 of FIG. 2. The image which is converted after erosion and expansion along B and appears at 28 is then processed by a logic circuit 29 comprising a delay line 30 having a time - duration equal to $t_o$ which is the duration of a scanning line, and two delay lines 31, 32 having a duration which is equal to $t_a$, namely the time interval which elapses between two successive sampling operations. It can readily be seen that the signals which appear simultaneously at the four points 33, 34, 35, 36 represent respectively four zones $b_4$, $b_3$, $b_2$, $b_1$ which are disposed on a square (as shown in FIG. 5) located on two successive scanning lines of the converted image. When the all-or-none data which constitute the electrical image are transferred in the course of time, said square moves through the object in successive translational displacements which are parallel to the scanning and have a modulus equal to "$a$" or to a multiple of "$a$."

Figure 6:
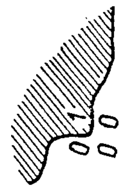
FIG. 6 and FIG. 7 are examples of location of the data in accordance with FIG. 5 in the image.
Figure 7:
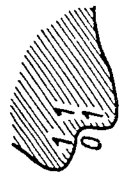

The four data which correspond to $b_1$, $b_2$, $b_3$, $b_4$, are sent to the columns of a diode programming matrix 37, the lines of which are connected to two counters 38, 39 which form part of the general counting circuit (as shown in FIG. 1). The matrix 37 is programmed so as to deliver to the counter 38 a signal having a value "1" at the time of occurrence of an event of the type represented by the following set of values :

$$b_1 = 0$$
$$b_2 = 1$$
$$b_3 = 0$$
$$b_4 = 0$$

as represented diagrammatically in FIG. 6 and "0" in the contrary case. Similarly, a signal having the value "1" is supplied to the counter 39 at the time of occurrence of an event of the type represented by the set of values :

$$b_1 = 1$$
$$b_2 = 1$$
$$b_3 = 0$$
$$b_4 = 1$$

as shown diagrammatically in FIG. 7 and "0" in the contrary case. It is clearly apparent from FIGS. 6 and 7 that these events represent the occurrences of salient angles (FIG. 6) and re-entrant angles (FIG. 7) of the grains of the image.

It is shown in the above-cited work by J. Serra that the difference between the number of salient angles and the number of re-entrant angles is equal to the number of grains in the converted image as applied to the circuit 19. By carrying out such enumerations in respect of different sizes of the hexagon B, it is therefore possible to construct a curve of enumeration as a function of the grain size.

The applications of the device are numerous and varied. By way of example, it is possible to mention counts of red or white corpuscules in the blood, counts of different particles (dust particles, pwoders and the like) and counts of pores or inclusions in minerals and metals. More generally, this logic system serves to determine characteristics of interest in objects under analysis such as the function of distribution of radii of curvature along the boundary between the grains and the pores. The mathematical and morphological significance of these different values is explained in the works which have already been cited.

A further example of application with a different combination of logic circuits can also be described by referring again to FIG. 4. If the signal derived from the inversion circuit 23 or in other words the image $A'c$ is applied directly to the input of the circuit 29, it is possible to count the pores of the initial image $A$. If the signal derived from the circuit 25 or in other words the image $A''$ is now applied to the same circuit 29,counting of the pores is carried out after erosion and expansion. It is shown in the above-cited work by J. Serra that the difference between these two counts measures the regrouping between pores, that is to say the proximity factor of said pores. This method can be employed among others in metallurgy for the purpose of defining and measuring the degree of coalescence of nonmetallic inclusions in metals.

It must clearly be understood that the modes of execution and applications which have just been described constitute only non-limitative examples and that it would be possible to devise a number of alternative forms and detail improvements as well as to contemplate the use of equivalent means without thereby departing either from the scope or the spirit of the present invention.

What is claimed is :

1. A logical device for analyzing the texture of a heterogeneous medium of which an electrical image is formed by displacing within said medium by suitable electronic scanning means, a zone in which a predetermined characteristic is to be detected and converted to a first electric signal which constitutes said electrical image and consists of a series of binary signals which can assume only one of two values, $e_0$ and $e_1$, wherein said device comprises in combination: a first logical processing system for forming a first converted electrical image comprising comparison means for receiving $p$ values representative of $p$ zones which are geometrically contiguous in the medium to be analyzed and for comparing said values one by one with a set of $p$ identical values which are equal to $e_1$ so as to form a structuring pattern and means for producing a second electric signal having a value $e_0$ when the aforesaid $p$ values are all equal simultaneously to $e_1$ and having a value $e_1$ when this is not the case, the series of binary signals which are thus constituted being such as to form the first converted image; and a counting system comprising a second logical processing system which is identical in every respect with said first logical processing system and supplies a second converted image in accordance with the same logical law and counting means which summate the numbers of binary signals of the second converted image, said counting system disposed to receive said series of binary signals.

2. A logical device for analyzing the texture of a heterogeneous medium of which an electrical image is formed by displacing within said medium by suitable electronic scanning means, a zone in which a predetermined characteristic is to be detected and converted to a first electric signal which constitutes said electrical image, wherein said device comprises in combination: a first logical processing system for forming a first converted electrical image, said first logical processing system comprising storage means for recording at each instant at least a portion of said electrical signal, comparison means receiving $P$ values from $P$ predetermined addresses of said storage means, said comparison means comparing said values one by one with a set of $P$ preselected values forming a standard structuring pattern, said comparison means producing a second electrical signal having different values depending on whether there is either concordance or discordance with said structuring pattern, said second signal being intended to constitute an information sequence which forms a first converted electrical image; said logical device comprising several such said logical processing systems each of them being intended to produce a further electric signal forming a further converted electrical image by receiving as an input signal a converted image produced by one of said processing systems; and a counting system comprising storage means which record the successive values of the last electric signal which forms the last converted electrical image, logical selection means for comparing by sets of $K$ the values which are thus stored, and for producing a last electrical signal having different values depending on whether there is either concordance or discordance between the $K$ values of each selected and compared set, and counting means connected to the output of said logical selection means, which counting means summate the numbers of concordances and discordances.

3. The logical device of claim 2 wherein a second logical processing system is followed by a third logical processing system for forming successively a second followed by a third converted electrical image.

4. A logical device for analyzing the texture of a heterogeneous medium of which an electrical image is formed by displacing within said medium by suitable electronic scanning means, a zone in which a predetermined characteristic is to be detected and converted to a first electric signal which forms a first information sequence constituting said electrical image, wherein said device comprises in combination: a first logical processing system including storage means which retain at each instant at least a portion of said image corresponding to the scanning displacement lengths between several different points which are distributed relatively to each other and to said zone according a given constant geometrical configuration forming a standard structuring pattern, and logical comparison means comparing at each said instant the stored values of the signal and producing at each said instant a second electric signal whose value depend on whether there is concordance or discordance between the compared stored values, said second signal constituting an other information sequence which forms a first converted image; and a second followed by a third logical processing systems of same nature but eventually different as to their processing parameters, for producing a second or a third converted electrical image, each of said electrical processing systems being intended to receive either one of the different electrical images as an input signal; and a counting system comprising storage means which record the successive values of the last electric signal which forms the last converted electrical image, logical selection means for comparing by sets of K the values which are thus stored and counting means which summate the concordance and discordance numerals at the output of said logical selection means.

5. An apparatus for analyzing the texture of a heterogeneous medium by counting the number of occurrences of at least one kind of textural characteristic in an electrical image of said medium, which electrical image is formed by detecting over a scanning path the presence or the absence of a predetermined characteristic in said medium and by converting said predetermined characteristic into an electrical signal representing said electrical image; said apparatus comprising a first logical processing system which includes a plurality of storage means, each storing at each instant a part of said signal during the time necessary to scan pairs of points which are distributed according to a given geometrical configuration forming a standard structuring pattern, and logical comparison means for comparing at each instant said signal and the stored values of this signal, which comparison means produce a second electrical signal having different values depending on whether there is either concordance or discordance of said signal with the stored values and constituting an information sequence which forms a first converted electrical image, the latter corresponding to an erosion of the electrical image through the standard structuring pattern; a first inversion device receiving said second electrical signal from said comparison means and forming a second information sequence which forms a first converted electrical complementary image; a second logical processing system identical with said first logical processing system receiving said first converted electrical complementary image, and followed by a second inversion device identical with said first inversion device and forming a further electrical signal which corresponds to an electrical image of only the areas of the medium in which said presence or absence of said characteristic is detected over a surface equal or larger than said standard structuring pattern; and electrical counting means which are connected to the output of either one of the inversion means.

* * * * *